US012614297B2

(12) United States Patent　　　(10) Patent No.:　US 12,614,297 B2
Ji et al.　　　　　　　　　　　　　　(45) Date of Patent:　Apr. 28, 2026

(54) DEPTH MAP RECONSTRUCTION METHOD AND APPARATUS FOR SCATTERING SCENE BASED ON REFOCUSING FOCAL STACK CORRESPONDING TO DIFFERENT OFFSET PIXELS BETWEEN VIEWS

(71) Applicant: TSINGHUA UNIVERSITY, Beijing (CN)

(72) Inventors: Xiangyang Ji, Beijing (CN); Xiaoyu Wang, Beijing (CN); Yi Zhang, Beijing (CN); Xiaocong Lian, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 767 days.

(21) Appl. No.: 17/989,722

(22) Filed: Nov. 18, 2022

(65) Prior Publication Data

US 2023/0154025 A1　　May 18, 2023

(30) Foreign Application Priority Data

Nov. 18, 2021　(CN) .......................... 202111367995.1

(51) Int. Cl.
　　*G06T 7/557*　　　(2017.01)
　　*G06T 7/12*　　　　(2017.01)
(52) U.S. Cl.
　　CPC ................ *G06T 7/557* (2017.01); *G06T 7/12* (2017.01)
(58) Field of Classification Search
　　None
　　See application file for complete search history.

(56) References Cited

U.S. PATENT DOCUMENTS 10,664,685 B2 * 5/2020 Hoffman ................ G02B 21/06
10,832,429 B2 * 11/2020 Blasco Claret ......... G06T 7/155
11,113,832 B2 * 9/2021 Wadhwa ................ G06V 20/10
11,763,471 B1 * 9/2023 Fang .................... G06V 10/806
　　　　　　　　　　　　　　　　　　　　382/106
2018/0239946 A1 * 8/2018 Hoffman .............. G02B 21/367
(Continued)

FOREIGN PATENT DOCUMENTS

CN　　104704821 A　　6/2015
CN　　108961392 A　　12/2018

OTHER PUBLICATIONS

First Office Action from corresponding Chinese Application No. 202111367995.1, dated Apr. 13, 2022. English translation attached.

*Primary Examiner* — Tahmina N Ansari

(57)　　　　　ABSTRACT

The present disclosure relates to the technical field of computer vision and digital image processing, and more particularly to a light field encoded imaging method and apparatus for a scattering scene. The method includes: obtaining scattering light field data, and extracting a refocusing focal stack corresponding to different offset pixels between views from the scattering light field data; transforming an image in the refocusing focal stack into a saturation domain to form a processed focal stack; comparing boundary sharpness degrees of each region in the processed focal stack when refocusing by different offset pixels, and extracting offset pixels corresponding to the sharpest boundary of each region by using a 1-norm operator; and converting the offset pixels into a depth map of a target based on data parameters of the light field.

9 Claims, 2 Drawing Sheets

Light field encoded imaging apparatus for a scattering scene

(56)           References Cited

U.S. PATENT DOCUMENTS

| | | | |
|---|---|---|---|
| 2019/0236796 A1* | 8/2019 | Blasco Claret | ......... G06T 7/557 |
| 2021/0183089 A1* | 6/2021 | Wadhwa | ................. G06T 7/557 |
| 2021/0241527 A1* | 8/2021 | Sun | ......................... G06T 17/20 |
| 2023/0154025 A1* | 5/2023 | Ji | ............................ G06T 7/557 |
| | | | 382/106 |

* cited by examiner

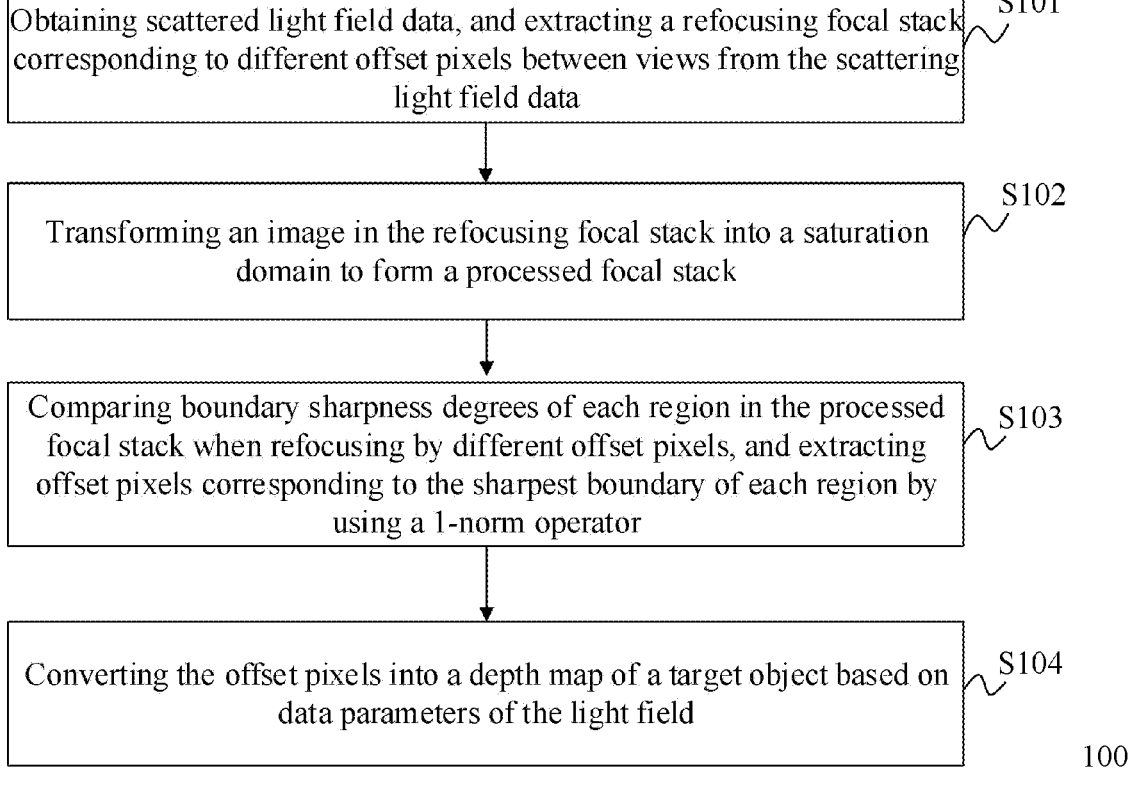

Obtaining scattered light field data, and extracting a refocusing focal stack corresponding to different offset pixels between views from the scattering light field data    S101

Transforming an image in the refocusing focal stack into a saturation domain to form a processed focal stack    S102

Comparing boundary sharpness degrees of each region in the processed focal stack when refocusing by different offset pixels, and extracting offset pixels corresponding to the sharpest boundary of each region by using a 1-norm operator    S103

Converting the offset pixels into a depth map of a target object based on data parameters of the light field    S104

| Obtaining module | Transformation module | Extracting module | Imaging module |

100          200          300          400    10

Light field encoded imaging apparatus for a scattering scene

FIG. 2

DEPTH MAP RECONSTRUCTION METHOD AND APPARATUS FOR SCATTERING SCENE BASED ON REFOCUSING FOCAL STACK CORRESPONDING TO DIFFERENT OFFSET PIXELS BETWEEN VIEWS

CROSS-REFERENCE TO RELATED APPLICATION

The present application claims priority to Chinese Patent Application No. 202111367995.1, entitled "LIGHT FIELD ENCODED IMAGING METHOD AND APPARATUS FOR SCATTERING SCENE" and filed with the China National Intellectual Property Administration on Nov. 18, 2021, which is incorporated herein by reference in its entirety.

FIELD

The present disclosure relates to the technical field of computer vision and digital image processing, and more particularly, to a light field encoded imaging method and an apparatus for a scattering scene.

BACKGROUND

In the related art, the light field depth map reconstruction technology can reconstruct the depth map of the target from multi-view light field data based on the texture features of the target without a priori. Generally, this technology is applied in a light field epipolar image or a refocusing focal stack, and has a wide application prospect in automatic driving, VR display, 3D reconstruction and the like. There are two ways to collect light field data: a microlens array camera and a camera array.

However, for a scattering scene (such as fog and turbid water), the texture feature information of the target will be difficult to identify due to the absorption and scattering effects of the media on light rays, which also causes the light field depth map reconstruction technology unable to be effectively applied to the scattering scene and greatly limits its application prospects.

SUMMARY

The present disclosure provides a light field encoded imaging method and apparatus for a scattering scene, in order to solve a problem that the light field depth map reconstruction technology cannot be effectively applied to the scattering scene in the related art, which limits the application prospect of the light field depth map reconstruction technology.

In a first aspect, an embodiment of the present disclosure provides a light field encoded imaging method for a scattering scene. The method includes: obtaining scattering light field data, and extracting a refocusing focal stack corresponding to different offset pixels between views from the scattering light field data; transforming an image in the refocusing focal stack into a saturation domain to form a processed focal stack; comparing boundary sharpness degrees of each region in the processed focal stack when refocusing by different offset pixels, and extracting offset pixels corresponding to the sharpest boundary of each region by using a 1-norm operator; and converting the offset pixels into a depth map of a target based on data parameters of the light field.

Optionally, in an embodiment of the present disclosure, said extracting the refocusing focal stack corresponding to the different offset pixels between views from the scattering light field data includes: representing a scattering sub-view color image of an $k^{th}$ row and an $l^{th}$ column under passive illumination by using $I_{kl}(x, y)$, where each of x and y represents a pixel dimension of the image, k represents a directions along x and l represents a directions along y, and defining a scatter interference as the following model:

$$I_{kl}(x, y) = J_{kl}(x, y)t(x, y) + A(x, y)[1 - t(x, y)],$$

where: $J_{kl}(x, y)$ represents a raw image of the target without scattering; t(x, y) represents a transmission map ranging from 0 to 1 and is used to describe the interference to the image caused by scattering media. t(x, y) is further represented to be $t(x, y) = e^{-\beta z(x,y)}$, where $\beta$ represents a scattering coefficient, and z(x, y) represents the depth map of the target; and A(x, y) represents a passive ambient illumination.

Optionally, in an embodiment of the present disclosure, the refocusing focal stack I(x, y, $\alpha$) is obtained based on the following equation:

$$I(x, y, \alpha) = \frac{1}{O(x, y)} \sum_{k=1}^{K} \sum_{l=1}^{L} I_{kl}[x + \alpha(k - k_{center}), y + \alpha(l - l_{center})],$$

where: K and L represent the total number of sub-views; $k_{center}$ represents the number of rows corresponding to a central view; $l_{center}$ represents the number of columns corresponding to the central view; O(x, y) represents overlapping times of sub-views; and $\alpha$ represents the offset pixel between different views. Different refocused images are obtained under different $\alpha$.

Optionally, in an embodiment of the present disclosure, a correspondence between the offset pixel $\alpha$ and the depth map of the target z is as follows:

$$\alpha = \frac{pf}{cz},$$

where f represents a focal length of a camera, c represents a pixel size of the camera sensor, and p represents a baseline distance between adjacent sub-view images.

Optionally, in an embodiment of the present disclosure, the offset pixels corresponding to the sharpest boundary of each region is obtained based on the following equation:

$$\alpha^*(x, y) = \arg\max_{\alpha} \left( \frac{1}{|W_s|} \sum_{(x,y) \in W_s} |S(x, y, \alpha) - \overline{S(x, y, \alpha)}| \right),$$

where $W_s$ represents a block region centered on (x, y), $|W_s|$ represents the total number of pixels in the block region, and $$\overline{S(x, y, \alpha)} = \frac{1}{|W_s|} \sum_{(x,y) \in W_s} S(x, y, \alpha)$$

represents a saturation mean value in the block region $W_s$ when the offset pixel is $\alpha$.

Optionally, in an embodiment of the present disclosure, the depth map is calculated based on the following equation:

$$z(x, y) = \frac{pf}{c\alpha^*(x, y)},$$

where $z(x, y)$ represents the depth map of the target.

Optionally, in an embodiment of the present disclosure, said converting the offset pixels into the depth map of the target further includes: using a peak saliency under a curve $d_{x,y}(\alpha)$ as a threshold of discrimination when the 1-norm operator acts on a smooth region or a boundary region of the target, determining a depth calculated in the boundary region of the target as a valid depth and a depth calculated in the smooth region of the target as an invalid depth, and making the depth calculated in the smooth region of the target equivalent to a depth calculated in an adjacent boundary region by using a principle of proximity consistency, where the curve $d_{x,y}(\alpha)$ is calculated based on the following equation:

$$d_{x,y}(\alpha) = \frac{1}{|W_s|} \sum_{(x,y) \in W_s} |S(x, y, \alpha) - \overline{S(x, y, \alpha)}|,$$

and where the peak saliency is defined as a ratio of a first peak to a second peak of the curve $d_{x,y}(\alpha)$.

In a second aspect, an embodiment of the present disclosure provides a light field encoded imaging apparatus for a scattering scene. The apparatus includes: an obtaining module configured to obtain scattering light field data, and extract a refocusing focal stack corresponding to different offset pixels between views from the scattering light field data; a transformation module configured to transform an image in the refocusing focal stack into a saturation domain to form a processed focal stack; an extraction module configured to compare boundary sharpness degrees of each region in the processed focal stack when refocusing by different offset pixels, and extract offset pixels corresponding to the sharpest boundary of each region by using a 1-norm operator; and an imaging module configured to convert the offset pixels into a depth map of a target based on data parameters of the light field.

In a third aspect, an embodiment of the present disclosure provides an electronic device. The electronic device includes a memory; a processor; and a computer program stored in the memory and executable on the processor. The processor, when executing the computer program, implements the light field encoded imaging method for a scattering scene as described in above embodiments.

In a fourth aspect, an embodiment of the present disclosure provides a computer-readable storage medium having a computer program stored thereon. The computer program, when executed by a processor, implements the light field encoded imaging method for a scattering scene as described in above embodiments.

According to the embodiments of the present disclosure, the light field data in a scattering scene is taken as an input, the offset pixels corresponding to the sharpest boundary information of each block region in the refocusing focal stack are identified by using a 1-norm operator in the saturation domain, the offset pixels are converted into the depth map of the target based on the data parameters of the light field. In this way, the reconstruction of the depth map of the target under scattering can be realized, an effectiveness of the reconstruction of the light field depth map can be extended to the scattering scene, and accuracy and applicability can be effectively ensured. Therefore, it solves the problem that the light field depth map reconstruction technology can not be effectively applied to the scattering scene in the related art, which limits the application prospect of the light field depth map reconstruction technology.

Additional aspects and advantages of the present disclosure will be provided at least in part in the following description, or will become apparent at least in part from the following description or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with accompanying drawings, in which:

FIG. 1 is a flowchart of a light field encoded imaging method for a scattering scene according to an embodiment of the present disclosure;

FIG. 2 is an example diagram of a light field encoded imaging apparatus for a scattering scene according to an embodiment of the present disclosure.

DESCRIPTION OF EMBODIMENTS

Figure 3:
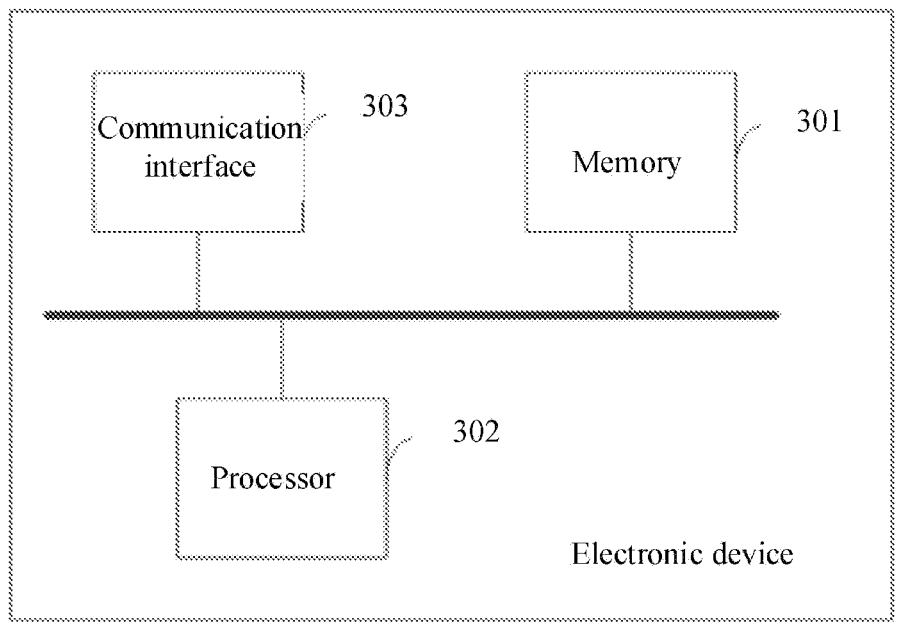
FIG. 3 is a schematic structural diagram of an electronic device according to an embodiment of the present disclosure.

The embodiments of the present disclosure will be described in detail below with reference to examples thereof as illustrated in accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A light field encoded imaging method and apparatus for a scattering scene according to embodiments of the present disclosure will be described below with reference to the drawings. Aiming at a problem in the related art mentioned in the background that the light field depth map reconstruction technology cannot be effectively applied to the scattering scene, which limits the application prospect of the light field depth map reconstruction technology, the present disclosure provides a light field encoded imaging method for a scattering scene. According to the method, the light field data in a scattering scene is taken as an input, the offset pixels corresponding to the sharpest boundary information of each block region in the refocusing focal stack are identified by using a 1-norm operator in the saturation domain, the offset pixels are converted into the depth map of the target based on the data parameters of the light field. In this way, the reconstruction of the depth map of the target under scattering can be realized, an effectiveness of the reconstruction of the light field depth map can be extended to the scattering scene, and accuracy and applicability can be effectively ensured. Therefore, it solves the problem that the light field depth map reconstruction technology cannot be effectively applied to the scattering scene in the related art, which limits the application prospect of the light field depth map reconstruction technology.

Specifically, FIG. 1 is a flowchart of a light field encoded imaging method for a scattering scene according to an embodiment of the present disclosure.

As shown in FIG. 1, the light field encoded imaging method for the scattering scene includes the following actions.

At step S101, scattering light field data is obtained, and a refocusing focal stack corresponding to different offset pixels between views is extracted from the scattering light field data.

It can be understood that, firstly, according to the embodiment of the present disclosure, the refocusing focal stack corresponding to the different offset pixels between different views is extracted from the scattering light field data.

Optionally, in an embodiment of the present disclosure, said extracting the refocusing focal stack corresponding to the different offset pixels between different views from the scattering light field data includes: representing a scattering sub-view color image of an $k^{th}$ row and an $l^{th}$ column under passive illumination by using $I_{kl}(x, y)$, where each of x and y represents a pixel dimension of the image, k represents a directions along x and l represents a directions along y, and defining a scatter interference as the following model:

$$I_{kl}(x, y) = J_{kl}(x, y)t(x, y) + A(x, y)[1 - t(x, y)],$$

where: $J_{kl}(x, y)$ represents a raw image of the target without scattering; t(x, y) represents a transmission map ranging from 0 to 1 and is used to describe the interference to the image caused by scattering media, t(x, y) is further represented to be $t(x, y)=e^{-\beta z(x, y)}$, where $\beta$ represents a scattering coefficient, and z(x, y) represents the depth map of the target; and A(x, y) represents a passive ambient illumination.

That is, as a possible implementation, at step S101, the scattering sub-view color image of an $k^{th}$ row and an $l^{th}$ column under passive illumination is represented by $I_{kl}(x, y)$, where each of x and y represents a pixel dimension of the image, k represents a directions along x and l represents a directions along y, and the scatter interference is defined as the following model:

$$I_{kl}(x, y) = J_{kl}(x, y)t(x, y) + A(x, y)[1 - t(x, y)],$$

where: $J_{kl}(x, y)$ represents a raw image of the target without scattering; t(x, y) represents a transmission map ranging from 0 to 1 and is used to describe the interference to the image caused by scattering media, t(x, y) is further represented to be $t(x, y)=e^{-\beta z(x, y)}$, where $\beta$ represents a scattering coefficient, and z(x, y) represents the depth map of the target; and A(x, y) represents a passive ambient illumination. The model can be applied to dynamic scattering media such as fog, haze, and turbid water.

In addition, in an embodiment of the present disclosure, the refocusing focal stack I(x, y, $\alpha$) is obtained based on the following equation:

$$I(x, y, \alpha) = \frac{1}{O(x, y)} \sum_{k=1}^{K} \sum_{l=1}^{L} I_{kl}[x + \alpha(k - k_{center}), y + \alpha(l - l_{center})],$$

where: K and L represent the total number of sub-views; $k_{center}$ represents the number of rows corresponding to a central view; $l_{center}$ represents the number of columns corresponding to the central view; O(x, y) represents overlapping times of sub-views; and $\alpha$ represents the offset pixel between different views. Different refocused images are obtained under different $\alpha$.

That is, as a possible implementation, in above steps, the refocusing focal stack I(x, y, $\alpha$) corresponding to the offset pixels between different views is obtained, and the process is as follows:

$$I(x, y, \alpha) = \frac{1}{O(x, y)} \sum_{k=1}^{K} \sum_{l=1}^{L} I_{kl}[x + \alpha(k - k_{center}), y + \alpha(l - l_{center})],$$

where: K and L represent the total number of sub-views; $k_{center}$ represents the number of rows corresponding to a central view; $l_{center}$ represents the number of columns corresponding to the central view; O(x, y) represents overlapping times of sub-views; and $\alpha$ represents the offset pixel between different views. Different refocused images are obtained under different $\alpha$.

Optionally, in an embodiment of the present disclosure, a correspondence between the offset pixel $\alpha$ and the depth map of the target is as follows:

$$\alpha = \frac{pf}{cz},$$

where f represents a focal length of a camera, c represents a pixel size of the camera sensor, and p represents a baseline distance between adjacent sub-view images.

At step S102, an image in the refocusing focal stack is transformed into a saturation domain to form a processed focal stack.

It can be understood that, secondly, according to the embodiment of the present disclosure, the image in the refocusing focal stack is transformed into the saturation domain, that is, the image I(x, y, $\alpha$) in the focal stack is transformed into the saturation domain to form S(x, y, $\alpha$). By transforming the image in the focal stack of the light field from the color RGB domain to the saturation domain, texture information of the target is greatly preserved to serve the subsequent depth map reconstruction of the scattering light field.

At step S103, boundary sharpness degrees of each region in the processed focal stack are compared when refocusing by different offset pixels, and offset pixels corresponding to the sharpest boundary of each region are extracted by using a 1-norm operator.

It can be understood that, further, according to the embodiment of the present disclosure, the boundary sharpness degrees of each region in the processed focal stack are compared when refocusing by different offset pixels, and the offset pixels corresponding to the sharpest boundary of each region are extracted by using the 1-norm operator.

Further, in an embodiment of the present disclosure, the offset pixels corresponding to the sharpest boundary of each region is obtained based on the following equation:

$$\alpha^*(x, y) = \arg \max_{\alpha} \left( \frac{1}{|W_s|} \sum_{(x,y) \in W_s} |S(x, y, \alpha) - \overline{S(x, y, \alpha)}| \right),$$

where $W_s$ represents a block region centered on (x, y), $|W_s|$ represents the total number of pixels in the block region, and $$\overline{S(x, y, \alpha)} = \frac{1}{|W_s|} \sum_{(x,y) \in W_s} S(x, y, \alpha)$$

represents a saturation mean value in the block region $W_s$ when the offset pixel is $\alpha$.

During an actual execution, as a possible implementation, a block-based 1-norm operator is designed to obtain the offset pixel $\alpha^*(x,y)$ corresponding to the sharpest boundary of the block, that is, the effective offset pixel corresponding to the depth of the target. The process is as follows:

$$\alpha^*(x, y) = \arg \max_\alpha \left( \frac{1}{|W_s|} \sum_{(x,y) \in W_s} \left| S(x, y, \alpha) - \overline{S(x, y, \alpha)} \right| \right),$$

where $W_s$ represents a block region centered on (x, y), $|W_s|$ represents the total number of pixels in the block region, and $$\overline{S(x, y, \alpha)} = \frac{1}{|W_s|} \sum_{(x,y) \in W_s} S(x, y, \alpha)$$

represents a saturation mean value in the block region $W_s$ when the offset pixel is $\alpha$.

At step S104, the offset pixels are converted into a depth map of a target based on data parameters of the light field.

It can be understood that, finally, according to the embodiment of the present disclosure, the offset pixels are converted into the depth map of the target based on the data parameters of the light field, and the depth map reconstruction under the scattering scene can be realized. Optionally, in an embodiment of the present disclosure, the depth map is calculated based on the following equation:

$$z(x, y) = \frac{pf}{c\alpha^*(x, y)},$$

where $z(x, y)$ represents the depth map of the target.

It should be understood by those skilled in art that, as a possible implementation, the offset pixel information can be converted into the depth map $z(x, y)$ of the target by using the parameters of the light field, that is, $$z(x, y) = \frac{pf}{c\alpha^*(x, y)}.$$

Specifically, in an embodiment of the present disclosure, said converting the offset pixels into the depth map of the target further includes:

using a peak saliency under a curve $d_{x,y}(\alpha)$ as a threshold of discrimination when the 1-norm operator acts on a smooth region or a boundary region of the target, determining a depth calculated in the boundary region of the target as a valid depth and a depth calculated in the smooth region of the target as an invalid depth, and making the depth calculated in the smooth region of the target equivalent to a depth calculated in an adjacent boundary region by using a principle of proximity consistency, where the curve $d_{x,y}(\alpha)$ is calculated based on the following equation:

$$d_{x,y}(\alpha) = \frac{1}{|W_s|} \sum_{(x,y) \in W_s} \left| S(x, y, \alpha) - \overline{S(x, y, \alpha)} \right|,$$

and where the peak saliency is defined as a ratio of a first peak to a second peak of the curve $d_{x,y}(\alpha)$.

It will be understood from the description of other related embodiments that, the peak saliency under the curve $d_{x,y}(\alpha)$ is used as the threshold of discrimination when the 1-norm operator acts on the smooth region or the boundary region of the target, the depth calculated in the boundary region of the target is determined as the valid depth and the depth calculated in the smooth region of the target is determined as the invalid depth, and the depth calculated in the smooth region of the target is made equivalent to the depth calculated in the adjacent boundary region by using the principle of proximity consistency, where the curve $d_{x,y}(\alpha)$ is calculated based on the following equation:

$$d_{x,y}(\alpha) = \frac{1}{|W_s|} \sum_{(x,y) \in W_s} \left| S(x, y, \alpha) - \overline{S(x, y, \alpha)} \right|,$$

and where the peak saliency is defined as a ratio of a first peak to a second peak of the curve $d_{x,y}(\alpha)$.

The principle of the embodiment of the present disclosure will be described in detail with one specific embodiment below. The method of an embodiment of the present disclosure includes the following actions.

Step A1, a refocusing focal stack I(x, y, $\alpha$) corresponding to different offset pixels between views is obtained based on scattering light field data.

$$I(x, y, \alpha) = \frac{1}{O(x, y)} \sum_{k=1}^{K} \sum_{l=1}^{L} I_{kl}[x + \alpha(k - k_{center}), y + \alpha(l - l_{center})],$$

where K and L represent the total number of sub-views; $k_{center}$ represents the number of rows corresponding to a central view; $l_{center}$ represents the number of columns corresponding to the central view; O(x, y) represents overlapping times of sub-views; $I_{kl}(x, y)$ represents a scattering sub-view color image of an $k^{th}$ row and an $l^{th}$ column under passive illumination, where each of x and y represents a pixel dimension of the image, k represents a directions along x and l represents a directions along y, and a scatter interference is defined as the following model:

$$I_{kl}(x, y) = J_{kl}(x, y)t(x, y) + A(x, y)[1 - t(x, y)],$$

where:

$J_{kl}(x, y)$ represents a raw image of the target without scattering; t(x, y) represents a transmission map ranging from 0 to 1 and is used to describe the interference to the image caused by scattering media, t(x, y) is further represented to be $t(x, y)=e^{-\beta z(x, y)}$, where $\beta$ represents the depth map of the target; and represents a scattering coefficient, and $z(x, y)$ $A(x, y)$ represents a passive ambient illumination. The model can be applied to dynamic scattering media such as fog, haze, and turbid water.

In addition, $\alpha$ represents the offset pixel between different views, and different refocused images are obtained under different $\alpha$. The correspondence between the offset pixel $\alpha$ and the depth map of the target is as follows:

$$\alpha = \frac{pf}{cz},$$

where f represents a focal length of a camera, c represents a pixel size of the camera sensor, and p represents a baseline distance between adjacent sub-view images.

Step A2, an image $I(x, y, \alpha)$ in the focal stack is transformed into a saturation domain to form $S(x, y, \alpha)$.

Step A3, based on focus stack information in the saturation domain, a block-region-based 1-norm operator is designed to obtain the offset pixel $\alpha^*(x, y)$ corresponding to the sharpest boundary of the block region, that is, the effective offset pixel corresponding to the depth of the target. The process is as follows:

$$\alpha^*(x, y) = \arg\max_\alpha \left( \frac{1}{|W_s|} \sum_{(x,y)\in W_s} \left| S(x, y, \alpha) - \overline{S(x, y, \alpha)} \right| \right),$$

where $W_s$ represents a block region centered on $(x, y)$, $|W_s|$ represents the total number of pixels in the block region, and $$\overline{S(x, y, \alpha)} = \frac{1}{|W_s|} \sum_{(x,y)\in W_s} S(x, y, \alpha)$$

represents a saturation mean value in the block region $W_s$ when the offset pixel is $\alpha$.

Step A4, the offset pixel information can be converted into a depth map $z(x, y)$ of a target based on parameters of the light field, and the depth reconstruction of the target is completed as followed, $$z(x, y) = \frac{pf}{c\alpha^*(x, y)}.$$

A peak saliency under a curve $d_{x,y}(\alpha)$ is used as a threshold of discrimination when the 1-norm operator acts on a smooth region or a boundary region of the target, a depth calculated in the boundary region of the target is determined as a valid depth and a depth calculated in the smooth region of the target is determined as an invalid depth, and the depth calculated in the smooth region of the target is made equivalent to a depth calculated in an adjacent boundary region by using a principle of proximity consistency, where the curve $d_{x,y}(\alpha)$ is calculated based on the following equation:

10

$$d_{x,y}(\alpha) = \frac{1}{|W_s|} \sum_{(x,y)\in W_s} \left| S(x, y, \alpha) - \overline{S(x, y, \alpha)} \right|,$$

and where the peak saliency is defined as a ratio of a first peak to a second peak of the curve $d_{x,y}(\alpha)$.

According to the light field encoded imaging method for the scattering scene provided by the embodiments of the present disclosure, the light field data in a scattering scene is taken as an input, the offset pixels corresponding to the sharpest boundary information of each block region in the refocusing focal stack are identified by using a 1-norm operator in the saturation domain, the offset pixels are converted into the depth map of the target based on the data parameters of the light field. In this way, the reconstruction of the depth map of the target under scattering can be realized, an effectiveness of the reconstruction of the light field depth map can be extended to the scattering scene, and accuracy and applicability can be effectively ensured.

Next, a light field encoded imaging apparatus for a scattering scene according to an embodiment of the present disclosure is described with reference to the drawings.

FIG. 2 is a block diagram of a light field encoded imaging apparatus for a scattering scene according to an embodiment of the present disclosure.

As shown in FIG. 2, the light field encoded imaging apparatus 10 for a scattering scene includes an obtaining module 100, a transformation module 200, an extraction module 300, and an imaging module 400.

Specifically, the obtaining module 100 is configured to obtain scattering light field data, and extract a refocusing focal stack corresponding to different offset pixels between views from the scattering light field data.

The transformation module 200 is configured to transform an image in the refocusing focal stack into a saturation domain to form a processed focal stack.

The extracting module 300 is configured to compare boundary sharpness degrees of each region in the processed focal stack when refocusing by different offset pixels, and extract offset pixels corresponding to the sharpest boundary of each region by using a 1-norm operator.

The imaging module 400 is configured to convert the offset pixels into a depth map of a target based on data parameters of the light field.

Optionally, in an embodiment of the present disclosure, the obtaining module 100 is specifically configured to represent a scattering sub-view color image of an $k^{th}$ row and an $1^{th}$ column under passive illumination by using $I_{kl}(x, y)$, where each of x and y represents a pixel dimension of the image, k represents a directions along x and 1 represents a directions along y, and define a scatter interference as the following model:

$$I_{kl}(x, y) = J_{kl}(x, y)t(x, y) + A(x, y)[1 - t(x, y)]$$

where: $J_{kl}(x, y)$ represents a raw image of the target without scattering; $t(x, y)$ represents a transmission map ranging from 0 to 1 and is used to describe the interference to the image caused by scattering media, $t(x, y)$; is further represented to be $t(x, y)=e^{-\beta z(x, y)}$, where $\beta$ represents a scattering coefficient, and $z(x, y)$ represents the depth map of the target; and $A(x, y)$ represents a passive ambient illumination.

Optionally, in an embodiment of the present disclosure, the refocusing focal stack I(x, y, α) is obtained based on the following equation:

$$I(x, y, \alpha) = \frac{1}{O(x, y)} \sum_{k=1}^{K} \sum_{l=1}^{L} I_{kl}[x + \alpha(k - k_{center}), y + \alpha(l - l_{center})],$$

where: K and L represent the total number of sub-views; $k_{center}$ represents the number of rows corresponding to a central view; $l_{center}$ represents the number of columns corresponding to the central view; O(x, y) represents overlapping times of sub-views; and α represents the offset pixel between different views. Different refocused images are obtained under different α.

Optionally, in an embodiment of the present disclosure, a correspondence between the offset pixel α and the depth map of the target is as follows:

$$\alpha = \frac{pf}{cz},$$

where f represents a focal length of a camera, c represents a pixel size of the camera sensor, and p represents a baseline distance between adjacent sub-view images.

Optionally, in an embodiment of the present disclosure, the offset pixels corresponding to the sharpest boundary of each region is obtained based on the following equation:

$$\alpha^*(x, y) = \arg\max_{\alpha} \left( \frac{1}{|W_s|} \sum_{(x,y) \in W_s} \left| S(x, y, \alpha) - \overline{S(x, y, \alpha)} \right| \right),$$

where $W_s$ represents a block region centered on (x,y), $|W_s|$ represents the total number of pixels in the block region, and $$\overline{S(x, y, \alpha)} = \frac{1}{|W_s|} \sum_{(x,y) \in W_s} S(x, y, \alpha)$$

represents a saturation mean value in the block region $W_s$ when the offset pixel is α.

Optionally, in an embodiment of the present disclosure, the depth map is calculated based on the following equation:

$$Z(x, y) = \frac{pf}{c\alpha^*(x, y)},$$

where z(x, y) represents the depth map of the target.

Optionally, in an embodiment of the present disclosure, said converting the offset pixels into the depth map of the target further includes:

using a peak saliency under a curve $d_{x,y}(\alpha)$ as a threshold of discrimination when the 1-norm operator acts on a smooth region or a boundary region of the target, determining a depth calculated in the boundary region of the target as a valid depth and a depth calculated in the smooth region of the target as an invalid depth, and making the depth calculated in the smooth region of the target equivalent to a depth calculated in an adjacent boundary region by using a principle of proximity consistency, where the curve $d_{x,y}(\alpha)$ is calculated based on the following equation:

$$d_{x,y}(\alpha) = \frac{1}{|W_s|} \sum_{(x,y) \in W_s} \left| S(x, y, \alpha) - \overline{S(x, y, \alpha)} \right|,$$

and where the peak saliency is defined as a ratio of a first peak to a second peak of the curve $d_{x,y}(\alpha)$.

It should be noted that the foregoing description of the embodiments of the light field encoded imaging method for the scattering scene is also applicable to the embodiments of the light field encoded imaging apparatus for the scattering scene, which will not be repeated here.

According to the light field coded imaging apparatus for the scattering scene provided by the embodiments of the present disclosure, the light field data in a scattering scene is taken as an input, the offset pixels corresponding to the sharpest boundary information of each block region in the refocusing focal stack are identified by using a 1-norm operator in the saturation domain, the offset pixels are converted into the depth map of the target based on the data parameters of the light field. In this way, the reconstruction of the depth map of the target under scattering can be realized, an effectiveness of the reconstruction of the light field depth map can be extended to the scattering scene, and accuracy and applicability can be effectively ensured.

FIG. 3 is a structural schematic diagram of an electronic device provided by an embodiment of the present disclosure. The electronic device may include: a memory 301; a processor 302; and a computer program stored in the memory 301 and executable on the processor 302. The processor 302, when executing the computer program, implements the light field encoded imaging method for the scattering scene provided by the embodiments described above.

Further, the electronic device further includes a communication interface 303 configured to perform communication between the memory 301 and the processor 302.

The memory 301 stores the computer program executable by the processor 302.

The memory 301 may include a cache Random-Access Memory (RAM), and may further include a non-volatile memory, e.g., at least one magnetic disk storage.

If the memory 301, the processor 302, and the communication interface 303 are implemented independently, the communication interface 303, the memory 301, and the processor 302 can be connected to each other through a bus and complete the communication with each other. The bus may be an Industry Standard Architecture (ISA) bus, a Peripheral Component Interconnect (PCI) bus, an Extended Industry Standard Architecture (EISA) bus, etc. The bus may be categorized into an address bus, a data bus, a control bus, etc. For ease of representation, only one thick line is used in FIG. 4, but the only one thick line does not mean that only one bus or one type of bus exists.

Optionally, in terms of specific implementation, if the memory 301, the processor 302, and the communication interface 303 are integrated on one chip, the memory 301, the processor 302, and the communication interface 303 can communicate with each other through an internal interface.

The processor 302 may be a Central Processing Unit (CPU), or an Application Specific Integrated Circuit (ASIC), or one or more integrated circuits configured to implement the embodiments of the present disclosure.

Embodiments of the present disclosure also provide a computer-readable storage medium having a computer program stored thereon. The computer program, when executed by a processor, implements the light field encoded imaging method for the scattering scene provided by the embodiments described above.

In the description of this specification, descriptions with reference to the terms "an embodiment", "some embodiments", "an example", "a specific example", "some examples", etc., mean that specific features, structure, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or imply the number of the indicated technical features. Thus, the feature defined with "first" and "second" may explicitly or implicitly include one or more this feature. In the description of the present disclosure, "N" means at least two, for example, two or three, unless specified otherwise.

Any process or method described in a flowchart or described herein in other ways may be understood to include one or more modules, segments or portions of codes of executable instructions for achieving specific logical functions or steps in the process, and the scope of a preferred embodiment of the present disclosure includes other implementations, in which it should be understood by those skilled in the art that functions may be implemented in a sequence other than the sequences shown or discussed, including in a substantially identical sequence or in an opposite sequence.

The logic and/or step described in other manners herein or shown in the flowchart, for example, a particular sequence table of executable instructions for realizing the logical function, may be specifically achieved in any computer readable medium to be used by the instructions execution system, device or equipment (such as a system based on computers, a system including processors or other systems capable of obtaining instructions from the instructions execution system, device and equipment executing the instructions), or to be used in combination with the instructions execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instructions execution system. For example, if it is realized by the hardware, likewise in another embodiment, the steps or methods may be realized by one or a combination of the following techniques known in the art: a discrete logic circuit having a logic gate circuit for realizing a logic function on a data signal, an application-specific integrated circuit having an appropriate combination logic gate circuit, a programmable gate array (PGA), a field programmable gate array (FPGA), etc.

Those skilled in the art shall understand that all or some of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A depth map reconstruction method for a scattering scene, comprising:

obtaining scattering light field data by imaging a target in the scattering scene via a microlens array camera or a camera array, and extracting a refocusing focal stack corresponding to different offset pixels between views from the scattering light field data;

transforming an image in the refocusing focal stack into a saturation domain to form a processed focal stack;

comparing boundary sharpness degrees of each region in the processed focal stack when refocusing by different offset pixels, and extracting offset pixels corresponding to the sharpest boundary of each region by using a 1-norm operator; and converting the offset pixels into a depth map of the target based on data parameters of the light field to allow depth map reconstruction of the target in the scattering scene, wherein the refocusing focal stack $I(x, y, \alpha)$ is obtained based on the following equation:

$$I(x, y, \alpha) = \frac{1}{O(x, y)} \sum_{k=1}^{K} \sum_{l=1}^{L} I_{kl}[x + \alpha(k - k_{center}), y + \alpha(l - l_{center})],$$

where: $I_{kl}(x, y)$ represents a scattering sub-view color image of an $k^{th}$ row and an $1^{th}$ column under passive illumination; K and L represent the total number of sub-views; $k_{center}$ represents the number of rows corresponding to a central view; $l_{center}$ represents the number of columns corresponding to the central view; $O(x, y)$ represents overlapping times of sub-views; and $\alpha$ represents the offset pixel between different views, different refocused images being obtained under different $\alpha$;

wherein the offset pixels corresponding to the sharpest boundary of each region is obtained based on the following equation:

$$\alpha^*(x, y) = \underset{\alpha}{\mathrm{argmax}}\left(\frac{1}{|W_s|}\sum_{(x,y)\in W_s}\left|S(x, y, \alpha) - \overline{S(x, y, \alpha)}\right|\right),$$

where $W_s$ represents a block region centered on (x, y), $|W_s|$ represents the total number of pixels in the block region, and $$\overline{S(x, y, \alpha)} = \frac{1}{|W_s|}\sum_{(x,y)\in W_s} S(x, y, \alpha)$$

represents a saturation mean value in the block region $W_s$ when the offset pixel is $\alpha$;

wherein the depth map is calculated based on the following equation:

$$z(x, y) = \frac{pf}{c\alpha^*(x, y)}.$$

where z(x, y) represents the depth map of the target; and wherein said converting the offset pixels into the depth map of the target further comprises:

using a peak saliency under a curve $d_{x,y}(\alpha)$ as a threshold of discrimination when the 1-norm operator acts on a smooth region or a boundary region of the target, determining a depth calculated in the boundary region of the target as a valid depth and a depth calculated in the smooth region of the target as an invalid depth, and making the depth calculated in the smooth region of the target equivalent to a depth calculated in an adjacent boundary region by using a principle of proximity consistency, wherein the curve $d_{x,y}(\alpha)$ is calculated based on the following equation:

$$d_{x,y}(\alpha) = \frac{1}{|W_s|}\sum_{(x,y)\in W_s}\left|S(x, y, \alpha) - \overline{S(x, y, \alpha)}\right|,$$

and wherein the peak saliency is defined as a ratio of a first peak to a second peak of the curve $d_{x,y}(\alpha)$.

2. The method according to claim 1, wherein said extracting the refocusing focal stack corresponding to the different offset pixels between views from the scattering light field data comprises:

representing a scattering sub-view color image of an $k^{th}$ row and an $1^{th}$ column under passive illumination by using $I_{kl}(x, y)$, where each of x and y represents a pixel dimension of the image, k represents a directions along x and 1 represents a directions along y, and defining a scatter interference as the following model:

$$I_{kl}(x,y)=J_{kl}(x,y)t(x,y)+A(x,y)[1-t(x,y)],$$

where: $J_{kl}(x, y)$ represents a raw image of the target without scattering; t(x, y) represents a transmission map ranging from 0 to 1 and is used to describe the interference to the image caused by scattering media, t(x, y) is further represented to be $t(x, y)=e^{-\beta z(x, y)}$, where $\beta$ represents a scattering coefficient, and z(x, y) represents the depth map of the target; and A(x, y) represents a passive ambient illumination.

3. The method according to claim 1, wherein a correspondence between the offset pixel $\alpha$ and the depth map of the target is as follows:

$$\alpha = \frac{pf}{cz},$$

where f represents a focal length of a camera, c represents a pixel size of the camera sensor, and p represents a baseline distance between adjacent sub-view images.

4. An electronic device, comprising:

a memory;

a processor; and a computer program stored in the memory and executable on the processor, wherein the processor, when executing the computer program, implements a depth map reconstruction method for a scattering scene, the method comprising:

obtaining scattering light field data by imaging a target in the scattering scene via a microlens array camera or a camera array, and extracting a refocusing focal stack corresponding to different offset pixels between views from the scattering light field data;

transforming an image in the refocusing focal stack into a saturation domain to form a processed focal stack;

comparing boundary sharpness degrees of each region in the processed focal stack when refocusing by different offset pixels, and extracting offset pixels corresponding to the sharpest boundary of each region by using a 1-norm operator; and converting the offset pixels into a depth map of the target based on data parameters of the light field to allow depth map reconstruction of the target in the scattering scene, wherein the refocusing focal stack I(x, y, $\alpha$) is obtained based on the following equation:

$$I(x, y, \alpha) = \frac{1}{O(x, y)} \sum_{k=1}^{K} \sum_{l=1}^{L} I_{kl}[x + \alpha(k - k_{center}), y + \alpha(l - l_{center})],$$

where: $I_{kl}(x, y)$ represents a scattering sub-view color image of an $k^{th}$ row and an $1^{th}$ column under passive illumination; K and L represent the total number of sub-views; $k_{center}$ represents the number of rows corresponding to a central view; $l_{center}$ represents the number of columns corresponding to the central view; $O(x, y)$ represents overlapping times of sub-views; and α represents the offset pixel between different views, different refocused images being obtained under different α;

wherein the offset pixels corresponding to the sharpest boundary of each region is obtained based on the following equation:

$$\alpha^*(x, y) = \arg\max_{\alpha}\left(\frac{1}{|W_s|}\sum_{(x,y)\in W_s}\left|S(x, y, \alpha) - \overline{S(x, y, \alpha)}\right|\right),$$

where $W_s$ represents a block region centered on (x, y), $|W_s|$ represents the total number of pixels in the block region, and $$\overline{S(x, y, \alpha)} = \frac{1}{|W_s|}\sum_{(x,y)\in W_s} S(x, y, \alpha)$$

represents a saturation mean value in the block region $W_s$ when the offset pixel is wherein the depth map is calculated based on the following equation:

$$z(x, y) = \frac{pf}{c\alpha^*(x, y)},$$

where z(x, y) represents the depth map of the target; and wherein said converting the offset pixels into the depth map of the target further comprises:

using a peak saliency under a curve $d_{x,y}(\alpha)$ as a threshold of discrimination when the 1-norm operator acts on a smooth region or a boundary region of the target, determining a depth calculated in the boundary region of the target as a valid depth and a depth calculated in the smooth region of the target as an invalid depth, and making the depth calculated in the smooth region of the target equivalent to a depth calculated in an adjacent boundary region by using a principle of proximity consistency, wherein the curve $d_{x,y}(\alpha)$ is calculated based on the following equation:

$$d_{x,y}(\alpha) = \frac{1}{|W_s|}\sum_{(x,y)\in W_s}\left|S(x, y, \alpha) - \overline{S(x, y, \alpha)}\right|,$$

and wherein the peak saliency is defined as a ratio of a first peak to a second peak of the curve $d_{x,y}(\alpha)$.

5. The electronic device according to claim 4, wherein said extracting the refocusing focal stack corresponding to the different offset pixels between views from the scattering light field data comprises:

representing a scattering sub-view color image of an $k^{th}$ row and an $l^{th}$ column under passive illumination by using $I_{kl}(x, y)$, where each of x and y represents a pixel dimension of the image, k represents a directions along x and l represents a directions along y, and defining a scatter interference as the following model:

$$I_{kl}(x,y)=J_{kl}(x,y)t(x,y)+A(x,y)[1-t(x,y)],$$

where: $J_{kl}(x, y)$ represents a raw image of the target without scattering; t(x, y) represents a transmission map ranging from 0 to 1 and is used to describe the interference to the image caused by scattering media, t(x, y) is further represented to be $t(x, y)=e^{-\beta z(x, y)}$, where β represents a scattering coefficient, and z(x, y) represents the depth map of the target; and A(x, y) represents a passive ambient illumination.

6. The electronic device according to claim 4, wherein a correspondence between the offset pixel α and the depth map of the target is as follows:

$$\alpha = \frac{pf}{cz},$$

where f represents a focal length of a camera, c represents a pixel size of the camera sensor, and p represents a baseline distance between adjacent sub-view images.

7. A non-transitory computer-readable storage medium, having a computer program stored thereon, wherein the computer program, when executed by a processor, implements a depth map reconstruction method for a scattering scene, the method comprising:

obtaining scattering light field data by imaging a target in the scattering scene via a microlens array camera or a camera array, and extracting a refocusing focal stack corresponding to different offset pixels between views from the scattering light field data;

transforming an image in the refocusing focal stack into a saturation domain to form a processed focal stack;

comparing boundary sharpness degrees of each region in the processed focal stack when refocusing by different offset pixels, and extracting offset pixels corresponding to the sharpest boundary of each region by using a 1-norm operator; and converting the offset pixels into a depth map of the target based on data parameters of the light field to allow depth map reconstruction of the target in the scattering scene, wherein the refocusing focal stack I(x, y, α) is obtained based on the following equation:

$$I(x, y, \alpha) = \frac{1}{O(x, y)}\sum_{k=1}^{K}\sum_{l=1}^{L}I_{kl}[x + \alpha(k - k_{center}), y + \alpha(l - l_{center})],$$

where: $I_{kl}(x, y)$ represents a scattering sub-view color image of an $k^{th}$ row and an $l^{th}$ column under passive illumination; K and L represent the total number of sub-views; $k_{center}$ represents the number of rows corresponding to a central view; $l_{center}$ represents the number of columns corresponding to the central view; O(x, y) represents overlapping times of sub-views; and α represents the offset pixel between different views, different refocused images being obtained under different α;

wherein the offset pixels corresponding to the sharpest boundary of each region is obtained based on the following equation:

$$\alpha^*(x, y) = \arg\max_{\alpha}\left(\frac{1}{|W_s|}\sum_{(x,y)\in W_s}\left|S(x, y, \alpha) - \overline{S(x, y, \alpha)}\right|\right),$$

where $W_s$ represents a block region centered on (x, y), $|W_s|$ represents the total number of pixels in the block region, and $$\overline{S(x, y, \alpha)} = \frac{1}{|W_s|} \sum_{(x,y) \in W_s} S(x, y, \alpha)$$

represents a saturation mean value in the block region $W_s$ when the offset pixel is $\alpha$;

wherein the depth map is calculated based on the following equation:

$$z(x, y) = \frac{pf}{c\alpha^*(x, y)},$$

where $z(x, y)$ represents the depth map of the target; and wherein said converting the offset pixels into the depth map of the target further comprises:

using a peak saliency under a curve $d_{x,y}(\alpha)$ as a threshold of discrimination when the 1-norm operator acts on a smooth region or a boundary region of the target, determining a depth calculated in the boundary region of the target as a valid depth and a depth calculated in the smooth region of the target as an invalid depth, and making the depth calculated in the smooth region of the target equivalent to a depth calculated in an adjacent boundary region by using a principle of proximity consistency, wherein the curve $d_{x,y}(\alpha)$ is calculated based on the following equation:

$$d_{x,y}(\alpha) = \frac{1}{|W_s|} \sum_{(x,y) \in W_s} |S(x, y, \alpha) - \overline{S(x, y, \alpha)}|,$$

and wherein the peak saliency is defined as a ratio of a first peak to a second peak of the curve $d_{x,y}(\alpha)$.

8. The non-transitory computer-readable storage medium according to claim 7, wherein said extracting the refocusing focal stack corresponding to the different offset pixels between views from the scattering light field data comprises:

representing a scattering sub-view color image of an $k^{th}$ row and an $l^{th}$ column under passive illumination by using $I_{kl}(x, y)$, where each of x and y represents a pixel dimension of the image, k represents a directions along x and l represents a directions along y, and defining a scatter interference as the following model:

$$I_{kl}(x,y) = J_{kl}(x,y)t(x,y) + A(x,y)[1 - t(x,y)],$$

where: $J_{kl}(x, y)$ represents a raw image of the target without scattering; $t(x, y)$ represents a transmission map ranging from 0 to 1 and is used to describe the interference to the image caused by scattering media, $t(x, y)$ is further represented to be $t(x, y) = e^{-\beta z(x, y)}$, where $\beta$ represents a scattering coefficient, and $z(x, y)$ represents the depth map of the target; and $A(x, y)$ represents a passive ambient illumination.

9. The non-transitory computer-readable storage medium according to claim 7, wherein a correspondence between the offset pixel $\alpha$ and the depth map of the target is as follows:

$$\alpha = \frac{pf}{cz},$$

where f represents a focal length of a camera, c represents a pixel size of the camera sensor, and p represents a baseline distance between adjacent sub-view images.

\*    \*    \*    \*    \*